United States Patent
Hong et al.

(10) Patent No.: US 8,737,921 B2
(45) Date of Patent: May 27, 2014

(54) COMMUNICATION SYSTEM OF DETECTING VICTIM TERMINAL AND PERFORMING INTERFERENCE COORDINATION IN MULTI-CELL ENVIRONMENTS

(75) Inventors: Young Jun Hong, Seoul (KR); Tae Soo Kwon, Hwaseong-si (KR); Chang Yong Shin, Seoul (KR); Kyung Hun Jang, Suwon-si (KR); Hee Jung Yu, Daejeon (KR); Hak Soo Kim, Daejeon (KR); Yong Hoon Lee, Daejeon (KR); Young Chul Sung, Daejeon (KR)

(73) Assignees: Samsung Electronics Co., Ltd., Suwon-si (KR); Korea Advanced Institute of Science and Technology, Daejeon (KR)

(*) Notice: Subject to any disclaimer, the term of this patent is extended or adjusted under 35 U.S.C. 154(b) by 248 days.

(21) Appl. No.: 12/907,467

(22) Filed: Oct. 19, 2010

(65) Prior Publication Data
US 2011/0124343 A1 May 26, 2011

(30) Foreign Application Priority Data

Oct. 22, 2009 (KR) .................. 10-2009-0100552
Jul. 8, 2010 (KR) .................. 10-2010-0065738

(51) Int. Cl.
*H04B 1/00* (2006.01)
*H04B 15/00* (2006.01)

(52) U.S. Cl.
USPC .................................... 455/63.1; 455/450

(58) Field of Classification Search
USPC ............ 455/446–449, 454, 63.1, 63.2, 67.11, 455/67.13, 67.14, 404.2, 434, 443–444, 455/456.1, 456.5, 552.1
See application file for complete search history.

(56) References Cited

U.S. PATENT DOCUMENTS

| | | | | |
|---|---|---|---|---|
| 8,442,572 | B2 * | 5/2013 | Borran et al. | 455/522 |
| 2005/0201447 | A1 * | 9/2005 | Cairns et al. | 375/148 |
| 2006/0099935 | A1 | 5/2006 | Gallagher et al. | |
| 2006/0126705 | A1 * | 6/2006 | Bachl et al. | 375/148 |
| 2006/0140314 | A1 * | 6/2006 | Kim et al. | 375/343 |
| 2007/0049280 | A1 * | 3/2007 | Sambhwani et al. | 455/442 |
| 2007/0238448 | A1 | 10/2007 | Gallagher et al. | |
| 2008/0130483 | A1 * | 6/2008 | Khandekar et al. | 370/208 |
| 2009/0163238 | A1 * | 6/2009 | Rao et al. | 455/522 |
| 2010/0002608 | A1 * | 1/2010 | Goldhamer | 370/280 |
| 2010/0167771 | A1 * | 7/2010 | Raghothaman et al. | 455/501 |
| 2010/0273473 | A1 * | 10/2010 | Meshkati et al. | 455/423 |
| 2010/0279703 | A1 * | 11/2010 | Morita et al. | 455/452.2 |
| 2011/0003559 | A1 * | 1/2011 | Morita et al. | 455/67.14 |

FOREIGN PATENT DOCUMENTS

| | | | |
|---|---|---|---|
| KR | 10-2009-0045183 | 5/2009 | |
| KR | 10-2009-0054578 | 6/2009 | |
| KR | 10-2009-0058828 | 6/2009 | |
| KR | 10-20100-030205 | 3/2010 | |
| WO | WO 2009/023587 A2 | 2/2009 | |
| WO | WO 2009/067700 A1 | 5/2009 | |
| WO | WO 2009122778 A1 * | 10/2009 | ............ H04W 16/16 |

* cited by examiner

*Primary Examiner* — Magdi Elhag
(74) *Attorney, Agent, or Firm* — NSIP Law

(57) ABSTRACT

Provided is a method, and an apparatus and communication system to perform the method, of detecting a victim terminal and performing an interference coordination in a multi-cell environment. The multi-cell environment may include a heterogeneous cell environment including a small cell and a macro cell. The method includes determining whether a macro terminal is located within a cell coverage of a small base station, and adjusting the cell coverage according to the determination.

22 Claims, 11 Drawing Sheets

COMMUNICATION SYSTEM OF DETECTING VICTIM TERMINAL AND PERFORMING INTERFERENCE COORDINATION IN MULTI-CELL ENVIRONMENTS

CROSS-REFERENCE TO RELATED APPLICATION(S)

This application claims the benefit under 35 U.S.C. §119 (a) of Korean Patent Application No. 10-2009-0100552, filed on Oct. 22, 2009, and Korean Patent Application No. 10-2010-0065738, filed on Jul. 8, 2010, in the Korean Intellectual Property Office, the entire disclosures of which are incorporated herein by reference for all purposes.

BACKGROUND

1. Field

The following description relates to a communication system of detecting a victim terminal and performing an interference coordination in a multi-cell environment including a heterogeneous cell environment having a small cell and a macro cell.

2. Description of Related Art

Currently, with developments in various types of wireless communication technologies and equipments, demands for wireless communications are rapidly increasing. The increasing demand for wireless communications may cause an insufficiency of limited frequency resources. Accordingly, demands to more effectively utilize frequency resources are increasing.

A heterogeneous cell environment denotes an environment in which small cells formed using small base stations within a macro cell are constructed in a form of a self-organizing network. A small cell formed by a small base station may include, for example, a remote radio head (RRH), a relay cell, a pico cell, a femto cell, a home Node B, a home enhanced-Node B (eNB), and the like. In the heterogeneous cell environment, the small base station should consider a macro user in the vicinity of the small base station. The small base station may detect unused resources which are originally allocated to a macro user and may appropriately perform a communication within a range which does not interfere with the resources being used by the macro user, exploiting the unused resources if possible. Accordingly, the small base station may operate in such a manner to enhance a frequency efficiency in the heterogeneous cell environment. The macro user may include, for example, a macro terminal that communicates with a macro base station.

A real-time cooperation between the macro cell and the small cell may not be easy. Accordingly, the small base station may need to sense the macro user without cooperation with the macro cell. Generally, the small base station may be unaware of a signal characteristic of the macro user and thus may sense the macro user using an energy detector. However, when the energy detector is used, a sensing error of the macro user may occur.

Such a sensing error of the macro user may deteriorate a utilization efficiency of resources or cause interference against the macro user.

SUMMARY

Example embodiments provide a method, and an apparatus to perform the method, of adjusting cell coverage of a small base station according to whether a macro terminal is determined to be located within the cell coverage of the small base station.

The foregoing and/or other features and utilities may be achieved by providing a method of detecting a victim terminal and performing an interference coordination at a small base station, the method including determining whether a macro terminal which transmits a signal to a macro base station exists within a cell coverage of the small base station, based on a silence resource used to sense the victim terminal, and adjusting the cell coverage of the small base station according to whether the macro terminal exists within the cell coverage of the small base station.

Whether the macro terminal exists within the cell coverage of the small base station may be determined by sensing the signal transmitted from the macro terminal to the macro base station.

The small base station may allocate a resource corresponding to an uplink resource allocated to the macro terminal as the silence resource, and may determine, using the allocated silence resource, whether the macro terminal exists within the cell coverage of the small base station.

The silence resource may be applied alike to at least one neighboring small base station of the small base station.

Each of the at least one neighboring small base station may determine whether the macro terminal exists within a cell coverage of a corresponding neighboring small base station, based on the silence resource.

The determining may include performing an energy detection according to an energy detection scheme to determine whether the macro terminal exists within the cell coverage of the small base station, and performing channel sensing based on a correlation between multi-path channels in response to the macro terminal existing within the cell coverage of the small base station.

The performing of the channel sensing may include estimating channel information based on a signal correlation of a received signal, calculating a comparison value to use in the channel sensing based on the received signal and the estimated channel information, and comparing the comparison value with a threshold.

The adjusting may include reporting to the macro base station regarding whether the macro terminal exists within the cell coverage of the small base station, and adjusting a transmit power of the small base station.

The foregoing and/or other features and utilities may be also achieved by providing a method of detecting a victim terminal and performing an interference coordination, the method including determining whether a macro terminal exists within a cell coverage according to an energy detection scheme, and performing channel sensing based on a correlation between multi-path channels in response to the macro terminal existing within the cell coverage.

The performing may include estimating channel information based on a signal correlation of a received signal, calculating a comparison value to use in the channel sensing based on the received signal and the estimated channel information, and comparing the comparison value with a threshold to provide a channel sensing result.

The foregoing and/or other features and utilities may also be achieved by providing a user terminal to communicate with a macro base station and a small base station, determine whether a macro terminal exists within a cell coverage of the small base station based on a silence resource used to sense a victim terminal, and operate to be recognizable by the small base station that adjusts the cell coverage of the small base station according to whether the macro terminal exists within the cell coverage of the small base station.

An uplink resource which may be used by the macro terminal to transmit a signal to the macro base station may be allocated within the silence resource.

The silence resource may be the same as a silence resource set by neighboring call base stations of the small base station.

The foregoing and/or other features and utilities may also be achieved by providing a communication apparatus to detect a victim terminal and perform an interference coordination, including a spectrum sensing unit to determine whether a macro terminal which transmits a signal to a macro base station exists within a cell coverage of a small base station, based on a silence resource used to sense a victim terminal, and a cell coverage adjustment unit to adjust the cell coverage of the small base station according to whether the macro terminal exists within the cell coverage of the small base station.

The spectrum sensing unit may determine whether the macro terminal exists within the cell coverage of the small base station by sensing the signal transmitted from the macro terminal to the macro base station.

The communication apparatus may further include a controller to allocate a resource corresponding to an uplink resource allocated to the macro terminal as the silence resource.

The silence resource may be applied alike to at least one neighboring small base station of the small base station, and each of the at least one neighboring small base station may determine whether the macro terminal exists within a cell coverage of a corresponding neighboring small base station, based on the silence resource.

The spectrum sensing unit may include a first detector to determine whether the macro terminal exists within the cell coverage of the small base station, according to an energy detection scheme, and a second detector to perform channel sensing based on a correlation between multi-path channels in response to the macro terminal existing within the cell coverage of the small base station.

The second detector may include a channel information estimator to estimate channel information based on a signal correlation of a received signal, a comparison value calculator to calculate a comparison value used in the channel sensing based on the received signal and the estimated channel information, and a comparator to compare the comparison value with a threshold.

The foregoing and/or other features and utilities may also be achieved by providing a method of detecting a victim terminal and performing an interference coordination at a small base station, the method including obtaining, from a macro base station, information associated with an uplink signal of a macro terminal, determining whether the victim terminal exists, based on a silence resource used to sense the victim terminal and the information associated with the uplink signal of the macro terminal, and performing a power control of the interference coordination according to whether the victim terminal exists.

The information associated with the uplink signal of the macro terminal may be obtained via a home gateway using a wireline backhaul, relayed from the macro terminal, relayed from a small cell terminal served by the small base station, directly received from the macro base station over the air connection, or any combination thereof.

The silence resource and information associated with the uplink signal may be shared by at least one neighboring small base station of the small base station, and each of the at least one neighboring base station may determine whether the victim terminal exists, based on the silence resource and information associated with the uplink signal.

The performing may be performed using a downlink resource allocated to protect a downlink of the victim terminal, the downlink silence resource may be shared by at least one neighboring small base station of the small base station, and the power control may include turning off a transmit power of the small base station.

The method may further include transmitting, to the macro base station, information associated with an awareness of the victim terminal, and receiving, from the macro base station, a message corresponding to information associated with the awareness of the victim terminal.

The foregoing and/or other features and utilities may also be achieved by providing a user terminal used in a communication system of detecting a victim terminal and performing an interference coordination in a multi-cell environment, including a relay unit to relay, to a small base station, information associated with an uplink signal of a macro terminal that is received from a macro base station, and an interference coordination request unit to transmit, to the small base station or the macro base station, a message associated with the interference coordination according to whether an interference signal is received from the small base station.

An uplink resource of the user terminal may be allocated within a silence resource allocated to the small base station, the silence resource may be used as a resource used in detecting the victim terminal at the small base station, and a downlink of the user terminal may be protected by a downlink silence resource allocated to the small base station.

The foregoing and/or other features and utilities may also be achieved by providing a method of detecting a victim terminal and performing an interference coordination at a small base station, the method including determining whether a macro terminal is located within a cell coverage of the small base station, and adjusting the cell coverage according to the determination.

According to various embodiments, it is possible to enhance a detection performance of a victim terminal by sensing a victim terminal using a silence resource corresponding to an uplink resource allocated to the macro terminal.

According to various embodiments, it is possible to enhance an accuracy with respect to a detection of a victim terminal by sharing information associated with an uplink signal of a victim terminal between a small base station and a macro base station.

According to various embodiments, it is possible to enhance a reliability of energy detection by performing channel sensing based on a correlation with respect to a multi-path channel.

Other features and aspects will be apparent from the following detailed description, the drawings, and the claims.

Figure 1:
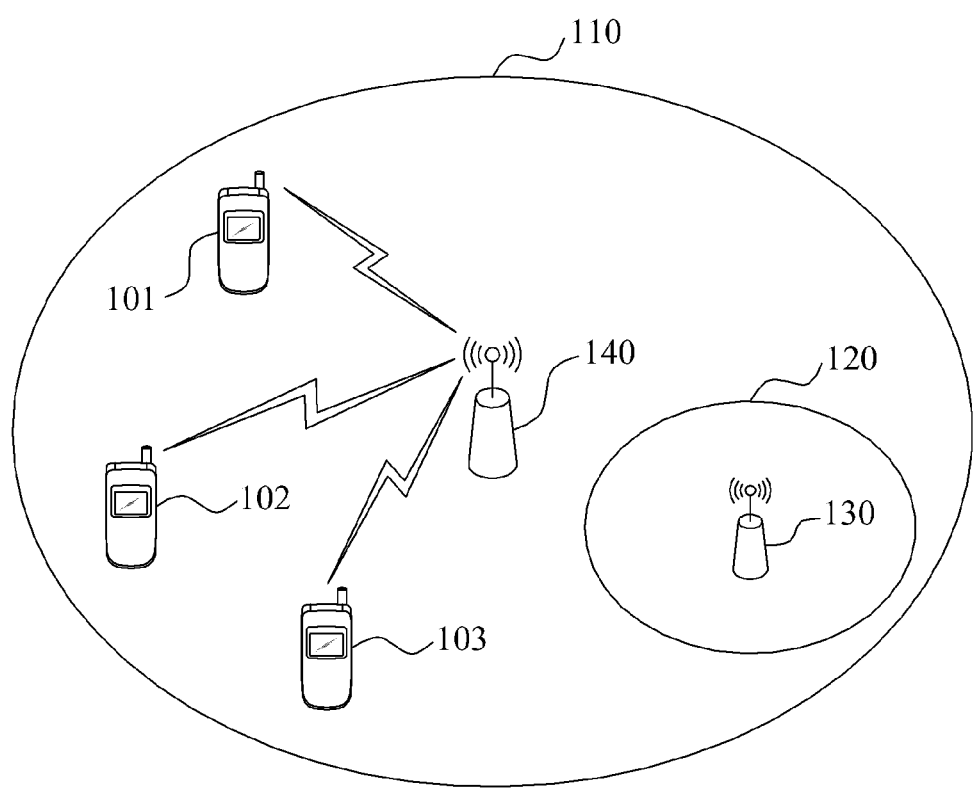
FIG. 1 is a diagram illustrating an example of a heterogeneous cell environment.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Any progression of operations described is merely an example, as the sequence and/or operations are not limited to those set forth herein and may be changed as is known in the art. Also, description of well-known functions and constructions may be omitted for increased clarity and conciseness.

The device and/or system denoted by the term "small base station" as used throughout the present specification may sense a channel to determine whether a macro user exists within or around a cell coverage of the small base station. The small base station may trigger an operation mode using a power control algorithm based on a result of channel sensing. The small base station may adjust the cell coverage of the small base station based on the triggered operation mode. The small base station may minimize an impact on the macro user by dynamically adjusting the cell coverage.

Embodiments herein are associated with a method and apparatus of detecting a victim terminal and performing an interference coordination in a multi-cell environment. Detection of the victim terminal may be performed using spectrum sensing. The spectrum sensing may be used to recognize interference channel information in a heterogeneous cell environment. Embodiments may be applicable to the heterogeneous cell environment and to an environment where an energy detection is utilized. For example, the energy detection may include a general purpose energy detection scheme using a pilot signal, a noise power, an interference, and/or the like.

The energy detection may be performed based on an assumption that a signal desired to be sensed is identically independently distributed. However, when a channel status does not correspond to an additive white Gaussian noise (AWGN) channel, the energy detection may cause an error. For example, when a macro user signal desired to be sensed is transmitted via a multi-path channel, a currently received signal may be correlated with previously received signals. In this example, since the energy detection assumes an AWGN channel, a performance degradation may occur. According to various embodiments, a channel sensing may be performed based on a correlation between multi-path channels and thus a reliability of the energy detection may be enhanced.

FIG. 1 illustrates an example of a heterogeneous cell environment.

Referring to FIG. 1, a heterogeneous cell may include a macro cell 110 and a small cell 120. The macro cell 110 may be formed by a cell coverage of a macro base station 140, and the small cell 120 may be formed by a cell coverage of a small base station 130.

User terminals 101, 102, and 103 may communicate with the macro base station 140 within the macro cell 110. A user terminal that may communicate with the macro base station 140 may be expressed as a macro terminal or a macro user. A terminal served by the small base station 130 within the cell coverage of the small base station 130 may be referred to as a small cell terminal.

The macro terminal may communicate with the macro base station 140 and the small base station 130, and may operate to be recognizable by the small base station 130. The small base station 130 may adjust a cell coverage of the small base station 130 depending on whether the macro terminal exists within the cell coverage of the small base station 130. The small base station 130 may determine whether the macro terminal exists within the cell coverage of the small base station 130 based on a silence resource used to sense the victim terminal.

In a case in which the small base station 130 determines that no macro user exists in the vicinity of the small cell 120, which may be referred to throughout this specification as being "around" the small cell 120, the small base station 130 may increase the cell coverage of the small base station 130 through a process such as cell breathing. The cell breathing may be performed by controlling a transmit power of the small base station 130. For example, the small base station 130 may increase the cell coverage of the small base station 130 by increasing the transmit power of the small base station 130, or may decrease the cell coverage of the small base station 130 by decreasing the transmit power of the small base station 130. The small base station 130 may completely turn off the transmit power to protect a downlink of the macro terminal within the cell coverage of the small base station 130.

Figure 2:
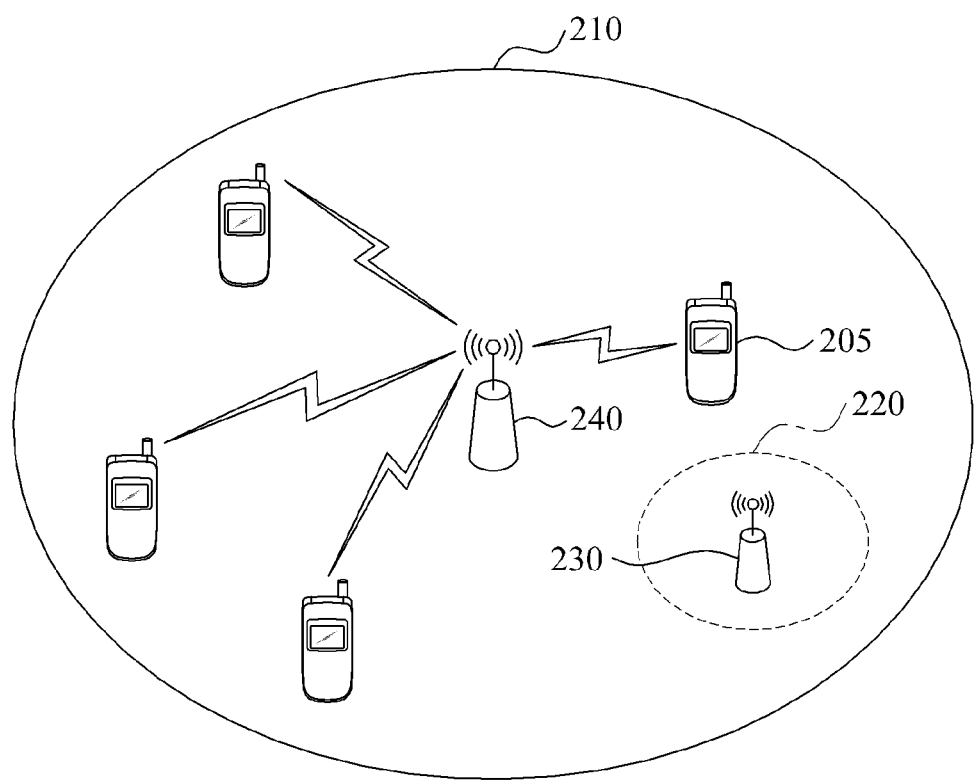
FIG. 2 is a diagram illustrating another example of a heterogeneous cell environment.

FIG. 2 illustrates another example of a heterogeneous cell environment.

Referring to FIG. 2, a small cell 220 may exist within a macro cell 210 and a macro user 205 may communicate with a macro base station 240. In this example, a small base station 230 may determine the macro user 205 exists within a cell coverage of the small base station 230 or in a vicinity of the small base station 230 and may decrease the cell coverage of the small base station 230 through cell breathing. The small base station 230 may completely turn off the transmit power to protect a downlink of the macro user 205 within the cell coverage of the small base station 230.

Figure 3:
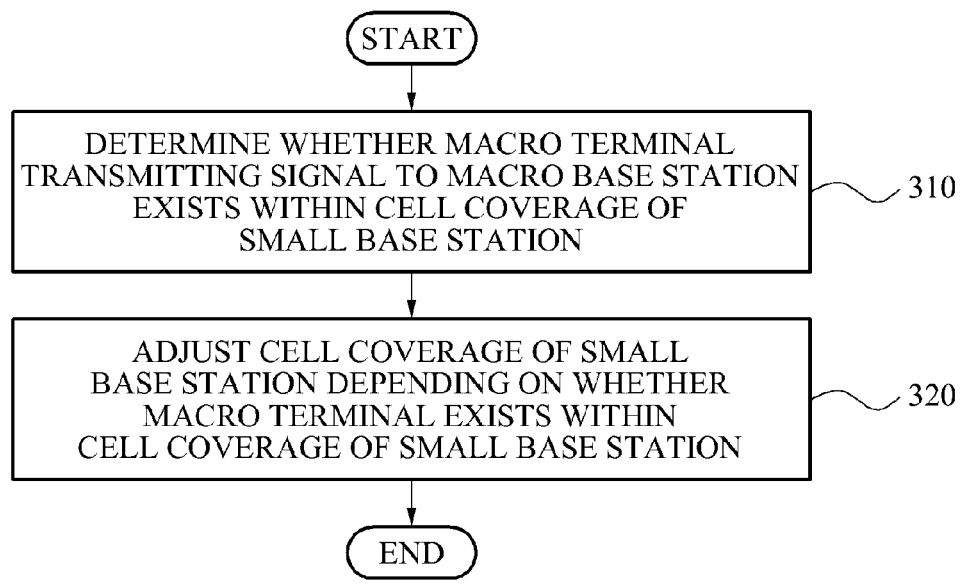
FIG. 3 is a flowchart illustrating an example of a method of detecting a victim terminal and performing an interference coordination.

FIG. 3 illustrates an example of a method of detecting a victim terminal and performing an interference coordination.

The method of detecting the victim terminal and performing the interference coordination may be performed by a small base station.

In operation 310, the small base station may determine whether a macro terminal transmitting a signal to a macro base station exists within a cell coverage of the small base station. The small base station may determine whether the macro terminal transmitting the signal to the macro base station exists within the cell coverage of the small base station by sensing the signal transmitted from the macro terminal to the macro base station. The small base station may allocate a time period corresponding to an uplink resource allocated to the macro terminal as a silence period used to sense the victim terminal, and may determine during the silence period whether the macro terminal transmitting the signal to the macro base station exists within the cell coverage of the small base station.

The silence period used to sense the victim terminal may be set to a common silence period (CSP) with respect to a cluster cell. The CSP will be described with reference to FIG. 4.

Figure 4:
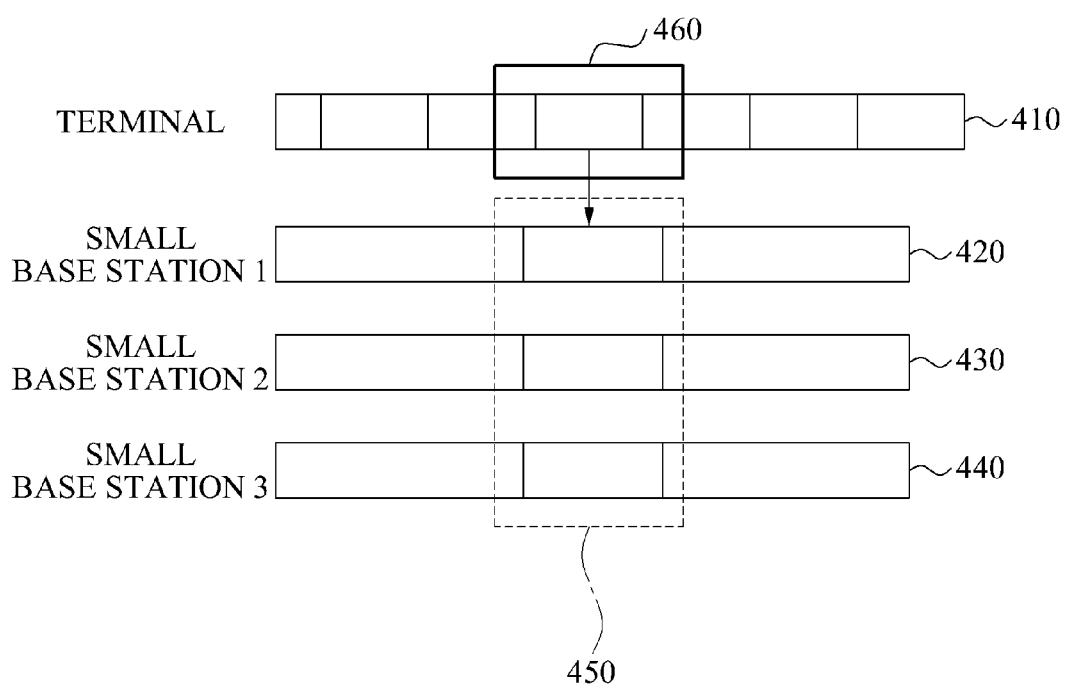
FIG. 4 is a diagram illustrating a common silence period.

FIG. 4 is a diagram illustrating a CSP 450.

Referring to FIG. 4, a small base station 1, a small base station 2, and a small base station 3 may form a cluster cell. Operation scheduling 420 of the small base station 1, operation scheduling 430 of the small base station 2, and operation scheduling 440 of the small base station 3 may include the CSP 450 of the cluster cell. The CSP 450 of the cluster cell may correspond to a period used by the small base station 1, the small base station 2, and the small base station 3 to sense an uplink signal of a macro terminal. The CSP 450 of the cluster cell may be periodically or aperiodically set. The small base station 1, the small base station 2, and the small base station 3 may sense the uplink signal of the macro terminal in the CSP 450 of the cluster cell to thereby enhance an accuracy of a macro terminal detection.

Accordingly, a neighboring base station adjacent to a predetermined small base station may determine during a CSP set by the predetermined small base station whether a macro terminal transmitting a signal to a macro base station exists within a cell coverage of the neighboring base station.

The macro terminal may be aware of the CSP 450 of the cluster cell and may allocate an uplink resource to a time period 460 corresponding to the CSP 450 of the cluster cell. For example, the operation scheduling 410 of the macro terminal may be set so that the uplink signal may be transmitted within the CSP 450 of the cluster cell.

According to an embodiment, a macro base station may control an uplink resource of a macro terminal located in a cell boundary to correspond to the CSP 450 of the cluster cell.

Accordingly, a small base station may allocate a time period corresponding to the uplink resource allocated to the macro terminal as a silence period used to sense a victim terminal, and may determine during the silence period whether a macro terminal transmitting a signal to the macro base station exists within a cell coverage of the small base station.

Referring again to FIG. 3, in operation 320, the small base station may adjust the cell coverage of the small base station depending on whether a macro terminal transmitting a signal to the macro base station exists within the cell coverage of the small base station. In operation 320, the small base station may report to the macro base station regarding whether the macro terminal transmitting the signal to the macro base station exists within the cell coverage of the small base station, and may adjust a transmit power of the small base station.

In this example, in the case in which the macro terminal exists within or around the cell coverage of the small base station, the small base station may decrease the cell coverage of the small base station. Conversely, in the case in which the macro terminal does not exist within or around the cell coverage of the small base station, the small base station may increase the cell coverage of the small base station. For example, the small base station may operate to avoid a downlink dead zone by sensing a spectrum transmitted from the macro terminal, and by controlling a transmit power of the small base station. If needed, the small base station may completely turn off a transmit power to protect the macro terminal within the cell coverage of the small base station.

In the example of FIG. 4, the CSP 450 of the cluster cell may be expanded to a concept of a "common silence resource". For example, a resource used herein may be interpreted to included a time, a frequency, or the like. In the common silence resource of the cluster cell, small base stations may operate in a mode used to listen to a received signal. In the common silence resource, the small base stations may be silent to listen to a signal, and may thereby enhance an accuracy with respect to detection of a victim terminal. The common silence resource may be set to correspond to a downlink resource of the macro terminal. In a case in which the common silence resource is set to correspond to the downlink resource of the macro terminal, the common silence resource may be referred to as a downlink common silence resource. The downlink of the macro terminal may be further protected by the downlink common silence resource.

Figure 5:
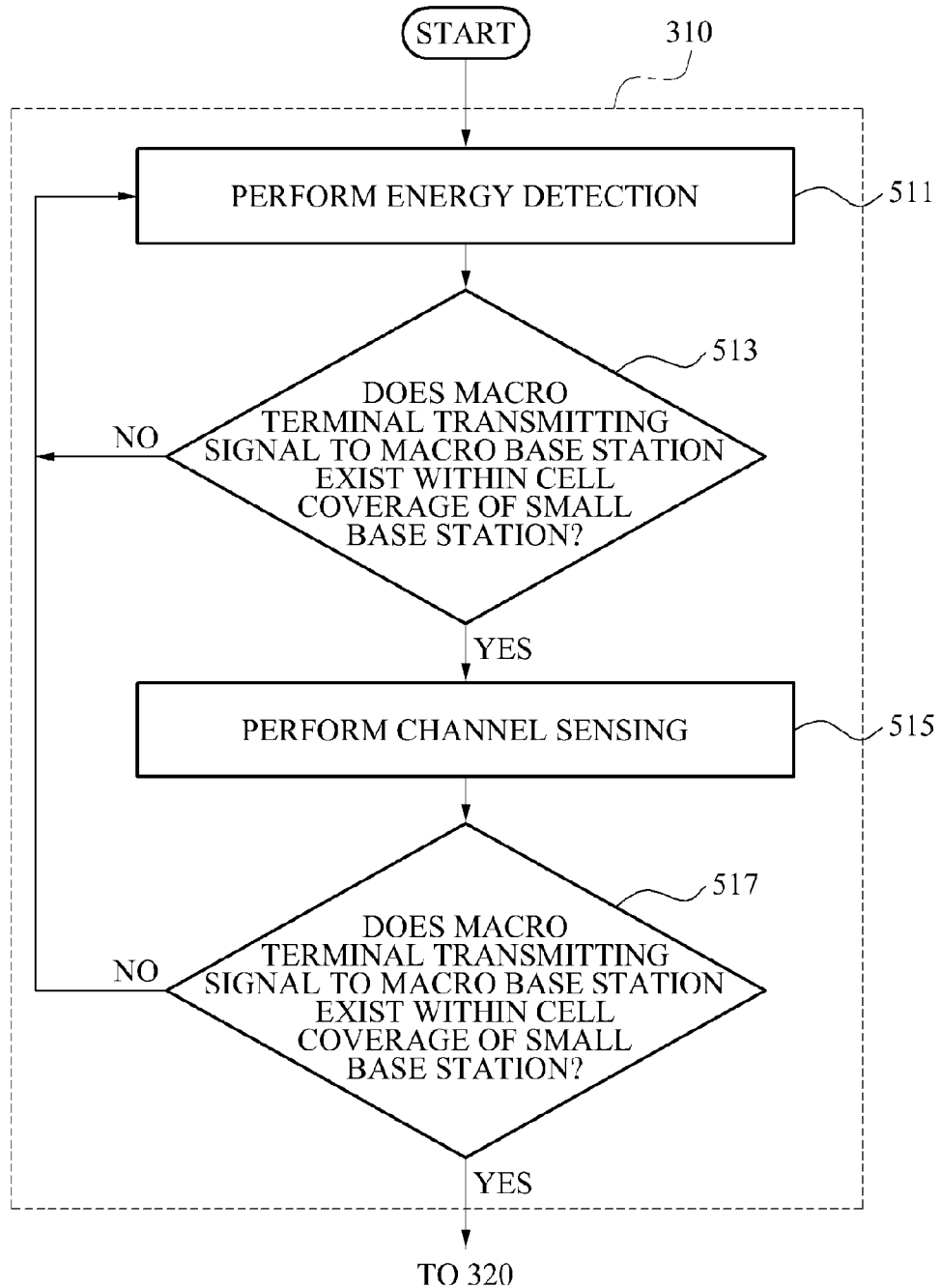
FIG. 5 is a flowchart illustrating an example of determining whether a macro terminal exists as illustrated in FIG. 3.

FIG. 5 illustrates an example of operation 310 of FIG. 3.

In operation 511, a small base station may perform an energy detection according to an energy detection scheme. The energy detection scheme may be, for example, a general purpose detection scheme that is performed based on an assumption that a signal desired to be sensed is identically independently distributed.

In operation 513, the small base station may determine whether the macro terminal transmitting the signal to the macro base station exists within the cell coverage of the small base station, based on an energy detection result.

In the case in which it is determined that the macro terminal transmitting the signal to the macro base station does exist within the cell coverage of the small base station in operation 513, the small base station may perform channel sensing based on a correlation between multi-path channels in operation 515.

Figure 6:
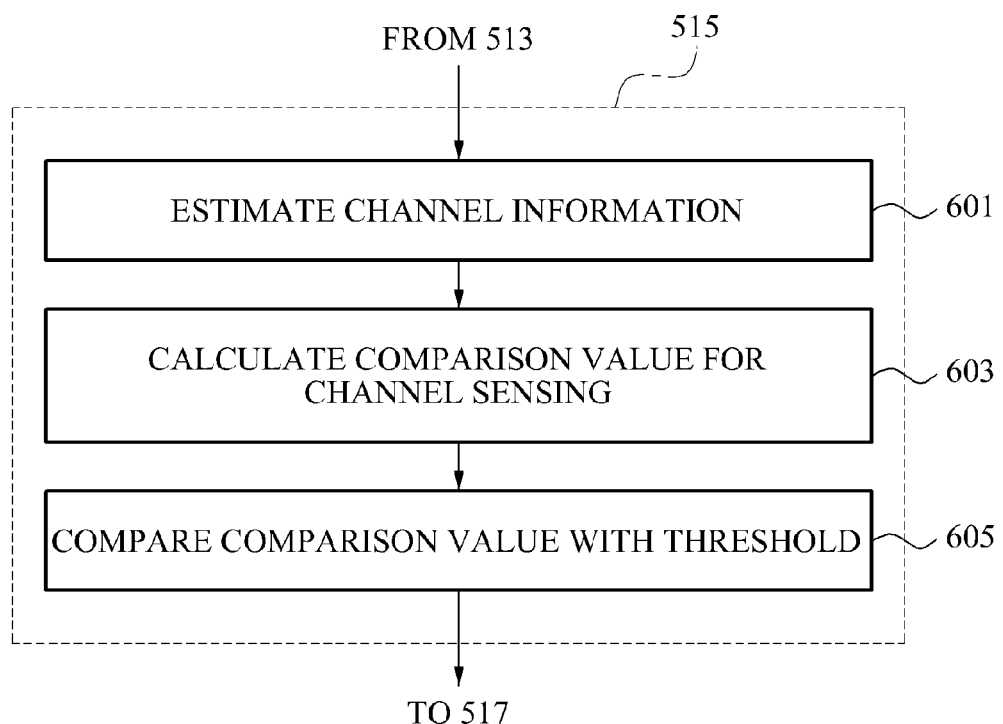
FIG. 6 is a flowchart illustrating an example of performing channel sensing as illustrated in FIG. 5.

FIG. 6 is a flowchart illustrating operation 515 of FIG. 5. As illustrated in FIG. 6, operation 515 may include operations 601, 603, and 605. In more detail, in operation 601, the small base station may estimate channel information based on a correlation of a received signal. In operation 603, the small base station may calculate a comparison value used in channel sensing based on the received signal and the estimated channel information. In operation 605, the small base station may compare the comparison value with a threshold. The channel sensing based on the correlation between the multi-path channels will be further described later in this specification.

In operation 517 of FIG. 5, the small base station may determine whether the macro terminal transmitting the signal to the macro base station exists within the cell coverage of the small base station, based on a channel sensing result.

The method of FIG. 6 may be applicable to a heterogeneous cell environment and/or to an environment where the energy detection scheme is employed. For example, a method of detecting a victim terminal and performing an interference coordination according to an embodiment may include determining whether a macro terminal exists within a cell coverage, and performing channel sensing based on a correlation between multi-path channels in a case in which the macro terminal exists within the cell coverage.

Figure 7:
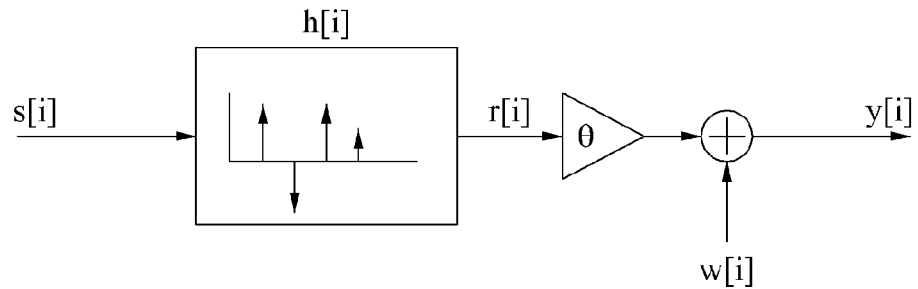
FIG. 7 is a diagram illustrating an example of a channel model between a macro terminal and a small base station.

FIG. 7 is a diagram illustrating an example of a channel model between a macro terminal and a small base station.

Referring to FIG. 7, S[i] denotes a signal transmitted from the macro terminal and is represented as a channel output signal r[i] after passing through a channel having a channel impulse response h[i]. Then, r[i] may pass through an unknown amplitude parameter θ and may then be transmitted over a wireless environment. A reception end of the small base station may receive a signal y[i] in which AWGN w[i] is added.

Figure 8:
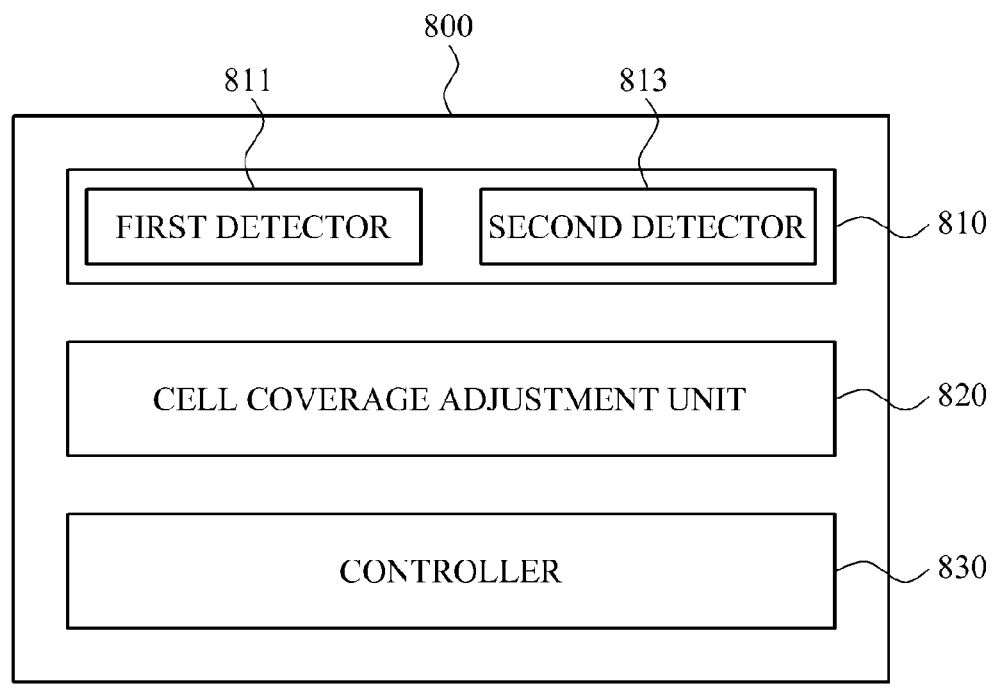
FIG. 8 is a block diagram illustrating an example of a communication apparatus.

FIG. 8 illustrates an example of a communication apparatus 800 that may detect a victim terminal and may perform an interference coordination. The communication apparatus 800 may be included in a small base station.

The communication apparatus 800 may include a spectrum sensing unit 810 and a cell coverage adjustment unit 820. The communication apparatus 800 may further include a controller 830.

The spectrum sensing unit 810 may determine whether a macro terminal transmitting a signal to a macro base station exists within a cell coverage of the small base station by sensing the signal transmitted from the macro terminal to the macro base station.

The spectrum sensing unit 810 may include a first detector 811 and a second detector 813. The first detector 811 may determine whether the macro terminal transmitting the signal to the macro base station exists within the cell coverage of the small base station according to an energy detection scheme. In a case in which the macro terminal transmitting the signal to the macro base station does exist within the cell coverage of the small base station, the second detector 813 may perform channel sensing based on a correlation between multi-path channels.

The cell coverage adjustment unit 820 may adjust the cell coverage of the small base station depending on whether the macro terminal transmitting the signal to the macro base station exists within the cell coverage of the small base station. The cell coverage adjustment unit 820 may completely turn off a transmit power to protect a downlink of the macro terminal within the cell coverage of the small base station.

The controller 830 may allocate a resource corresponding to an uplink resource allocated to the macro terminal as a silence resource used to sense the victim terminal.

Figure 9:
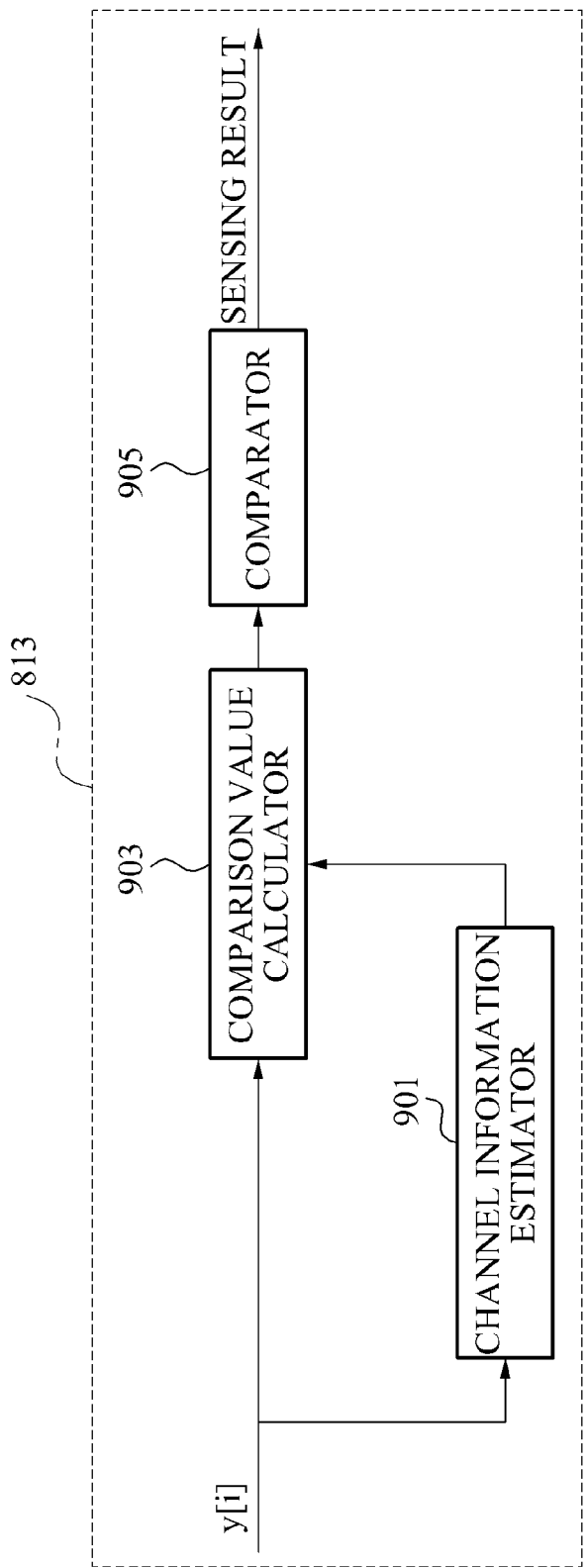
FIG. 9 is a block diagram illustrating an example of the second detector illustrated in FIG. 8.

FIG. 9 illustrates an example of the second detector 813 of FIG. 8.

Referring to FIG. 9, the second detector 813 may include a channel information estimator 901, a comparison value calculator 903, and a comparator 905.

The channel information estimator 901 may estimate channel information based on a correlation of a received signal. The channel information may be, for example, an autocorrelation coefficient of the received signal.

In a case in which a macro terminal does not transmit a signal, or in a case in which the macro terminal does transmit a signal, a signal received by the communication apparatus 800 may be defined as the following Equation 1.

$$H_0: y[i] = w[i], i = 1, 2 \ldots, n \quad \text{[Equation 1]}$$
$$H_1: y[i] = \theta r[i] + w[i], i = 1, 2 \ldots, n$$
$$\text{where } r[i] = \sum_{k=1}^{L} h[k]s[i-k]$$

In this example, $H_0$ denotes a null hypothesis, and indicates a case in which a reception end of a small base station receives only noise since the macro terminal does not transmit a signal from a macro terminal. $H_1$ denotes an alternative hypothesis, and indicates a case in which the reception end of the small base station receives a signal with the added noise through multiple paths. w[i] denotes identically independently distributed complex Gaussian noise and a probability parameter with a zero mean and a variance of $\sigma^2$. θ denotes a magnitude change of an unknown signal. Channel coefficients $h_1 \ldots h_L$ denote finite impulse response (FIR) channel coefficients transferred from the macro terminal to the small base station, and indicate complex random variable(s). s[i] denotes the signal transmitted from the macro terminal and an identically independently distributed probability parameter with a zero mean and a unit variance. $H_0$ and $H_1$ may be used to determine whether the macro terminal exists within the cell coverage.

The channel information estimator 901 may generate a covariance matrix. The estimated channel information may correspond to the covariance matrix as given by the following Equation 2.

$$\Sigma_r = \begin{bmatrix} \gamma_0 & \gamma_{-1} & \cdots & \gamma_{-L+1} & 0 & \cdots & \cdots \\ \gamma_1 & \gamma_0 & \gamma_{-1} & \ddots & \gamma_{-L+1} & 0 & \cdots \\ \vdots & \gamma_1 & \gamma_0 & \gamma_{-1} & \ddots & \gamma_{-L+1} & 0 \\ \gamma_{L-1} & \ddots & \ddots & \ddots & \ddots & \ddots & \gamma_{-L+1} \\ 0 & \gamma_{L-1} & \ddots & \gamma_1 & \gamma_0 & \gamma_{-1} & \vdots \\ \vdots & 0 & \gamma_{L-1} & \ddots & \gamma_1 & \gamma_0 & \gamma_{-1} \\ \vdots & \vdots & 0 & \gamma_{L-1} & \cdots & \gamma_1 & \gamma_0 \end{bmatrix} \quad \text{[Equation 2]}$$

In a case in which the channel information is known, element values of the covariance matrix shown in the above Equation 2 may be calculated according to Equation 3 below. In a case in which the channel information is unknown, the element values of the covariance matrix may be calculated according to Equation 4 below.

$$\gamma_m = \mathbb{E}\{r[i]r^*[i-m]\}, \quad \text{[Equation 3]}$$
$$= \begin{cases} \sum_{k=m+1}^{L} h[k]h^*[k-m], & -L+1 \leq m \leq L-1 \\ 0 & o.w., \end{cases}$$
$$\gamma_0 = \mathbb{E}\{r^2[i]\} = \mathbb{E}\{s^2[i]\} \sum_{i=1}^{L} |h[k]|^2 = 1$$

$$\hat{\gamma}_k = \frac{1}{n} \sum_{i=1}^{n-k} y^*[i]y[i+k], k = 0, 1, \ldots, L-1 \quad \text{[Equation 4]}$$

In this example, * denotes a complex conjugate.

Since AWGN is not added in a signal received by the small base station, the channel information estimated according to the above Equation 4 may include an error compared to actual channel information. In this case, upon the channel estimation process being repeated and estimation values being accumulated, an approximate value near to the above Equation 3 may be obtained.

The comparison value calculator 903 may calculate the comparison value used in the channel sensing based on the received signal and the estimated channel information. The comparison value $T(y_n)$ may be calculated as given by the following Equation 5.

$$T(y_n) = \frac{1}{n} y_n^H \Sigma_r y_n \quad \text{[Equation 5]}$$

In this example, $y_n$ denotes a signal vector received by the small base station and $(\ )^H$ denotes a Hermitian operation.

The comparator 905 may compare the comparison value $T(y_n)$ with a threshold $\tau$, and may output a sensing result. In a case in which the comparison value $T(y_n)$ is greater than or equal to the threshold $\tau$, the comparator 905 may determine that the macro terminal does exist around or within the cell coverage of the small base station. Conversely, in a case in which the comparison value $T(y_n)$ is less than the threshold $\tau$, the comparator 905 may determine that the macro terminal does not exist around the cell or within the cell coverage of the small base station. For example, the comparator 905 may determine the sensing result, as illustrated in the following Equation 6.

$$T(y_n) = \frac{1}{n} y_n^H \Sigma_r y_n \mathop{\gtrless}_{<H_0}^{\geq H_1} \tau \qquad \text{[Equation 6]}$$

In this example, the threshold $\tau$ denotes a constant satisfying a false alarm probability. In a case in which the false alarm probability of $P^f$ is allowed, the comparator 905 may set the threshold $\tau$ to satisfy $\Pr[T(y_n) \geq \tau] = P_f$.

As described above, a method and apparatus of detecting a victim terminal and performing an interference coordination according to an embodiment may decrease a false alarm probability or a miss detection probability compared to a case in which only an energy detection scheme is employed. It is also possible to cause less interference to a macro user and to enhance a system throughput. As a sensing interval may be variably adjusted, it is possible to accomplish the same system throughput using a relatively small number of sensing samples compared to a case in which only the energy detection scheme is employed.

An apparatus to detect a victim terminal and perform an interference coordination according to an embodiment may be applicable to a heterogeneous cell environment and to an environment in which an energy detection scheme is employed. The apparatus to detect the victim terminal and perform the interference coordination may include a first detector to determine whether a macro terminal exists within a subject cell coverage according to the energy detection scheme, and a second detector to perform channel sensing based on a correlation between multi-path channels in a case in which the macro terminal does exist within the cell coverage.

Embodiments of detecting a victim terminal and performing an interference coordination are described above with respect to FIGS. 1 through 9. Hereinafter, embodiments of detecting a victim terminal by a small base station will be further described.

Figure 10:
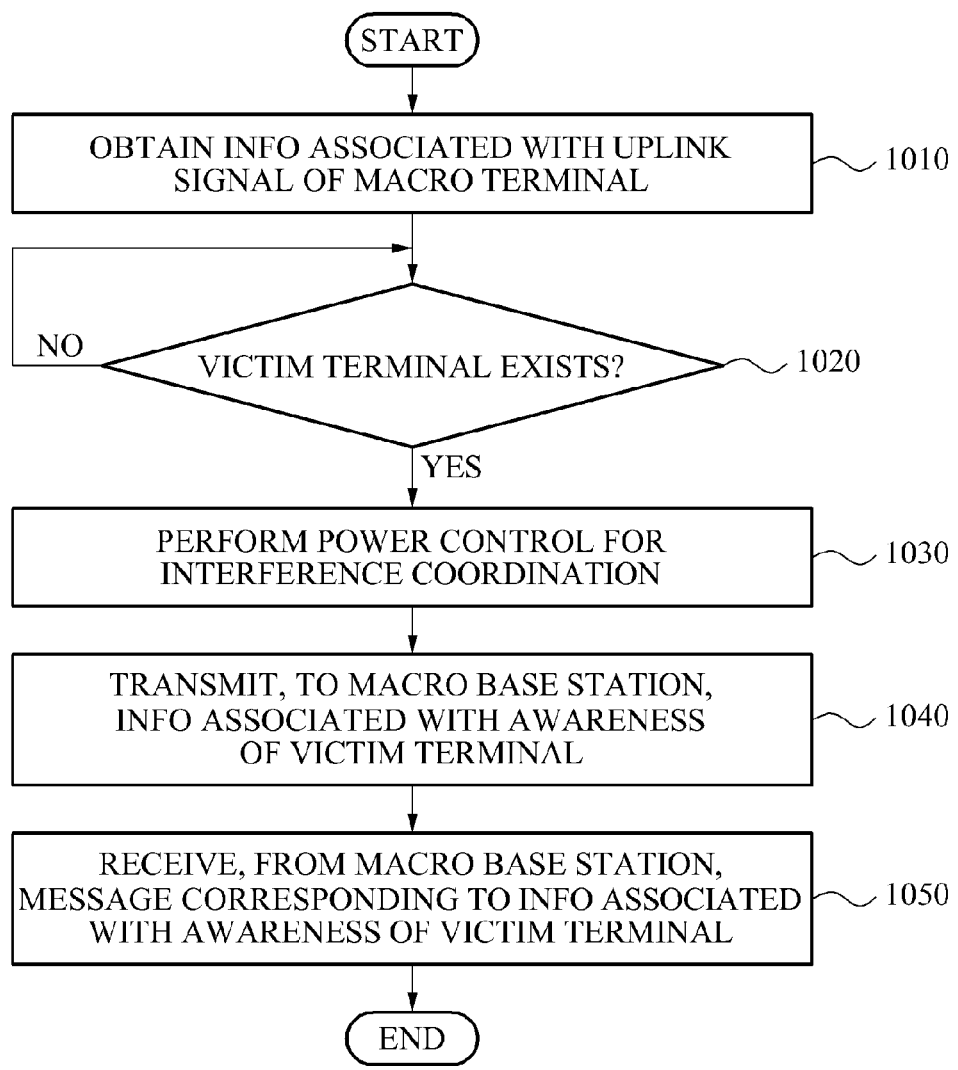
FIG. 10 is a flowchart illustrating an example of a method detecting a victim terminal and performing an interference coordination.
Figure 11:
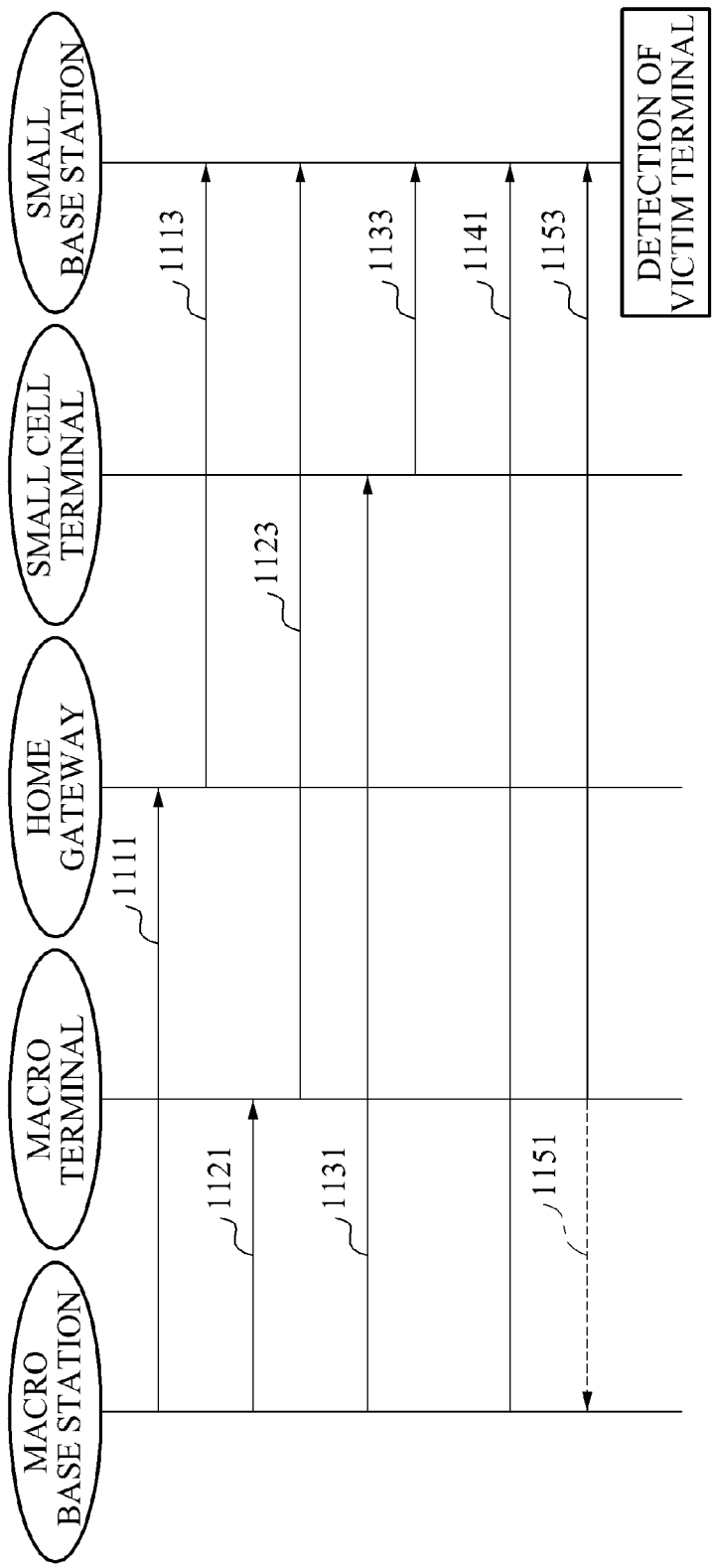
FIG. 11 is a diagram illustrating examples of obtaining information associated with an uplink signal of a macro terminal as illustrated in FIG. 10.

FIG. 10 illustrates an example of a method of detecting a victim terminal and performing an interference coordination. FIG. 11 is a diagram illustrating an example of obtaining information associated with an uplink signal of a macro terminal as illustrated in operation 1010 of FIG. 10.

The method of FIG. 10 may be performed by a small base station.

In operation 1010, the small base station may obtain, from a macro base station, information associated with an uplink signal of a macro terminal. Operation 1010 may be performed by including operations 1111 through 1153 of FIG. 11. Information associated with the uplink signal of the macro terminal may be a predetermined format of the uplink signal. The small base station may detect the victim terminal based on information associated with the uplink signal of the macro terminal. For example, in operation 1010, the small base station may obtain, from the macro base station, information associated with an uplink silence resource and/or a downlink silence resource.

In operation 1020, the small base station may determine whether the victim terminal exists, based on a silence resource used to sense the victim terminal and information associated with the uplink signal of the macro terminal. The small base station may use the silence resource as a resource used to detect the victim terminal. The silence resource and information associated with the uplink signal may be shared by at least one neighboring small base station adjacent to the small base station. Each of the at least one neighboring small base station may determine whether the victim terminal exists, based on the silence resource and information associated with the uplink signal of the macro terminal. The small base station may detect the victim terminal by determining whether a signal received from the macro terminal is a predetermined uplink signal. In such a case, whether the signal received from the macro terminal is the predetermined uplink signal may be determined based on a predetermined resource, a signal pattern, a predetermined sequence, and/or the like. Also, whether the signal received from the macro terminal is the predetermined uplink signal may be determined based on a sounding signal, a reference signal, a control signal, a data signal, and/or the like. Also, whether the signal received from the macro terminal is the predetermined uplink signal may be determined based on the signal of a particular pattern. As described above, the small base station may more accurately detect the existence of the victim terminal by sharing information between the macro base station and the small base station.

In operation 1030, the small base station may perform a power control used in the interference coordination depending on whether the victim terminal exists within the cell coverage of the small base station. For example, in the cluster cell environment illustrated in FIG. 4, the power control may be performed alike by the small base station 1, the small base station 2, and/or the small base station 3. Operation 1030 may be performed in a downlink silence resource allocated to protect the downlink of the victim terminal. The downlink silence resource may be shared by at least one neighboring small base station of the small base station. The power control may include a complete turn-off with respect to the transmit power of the small base station.

In operation 1040, the small base station may transmit, to the macro base station, information associated with an awareness of the victim terminal. The awareness of the victim terminal may indicate that the macro terminal that may be affected by the small base station does exist within the cell coverage of the small base station.

In operation 1050, the small base station may receive, from the macro base station, a message corresponding to information associated with the awareness of the victim terminal. The message corresponding to information associated with the awareness of the victim terminal may include a variety of information. For example, the message may include a downlink schedule of the macro terminal. The small base station may protect the downlink of the macro terminal by setting the downlink silence resource by referring to the downlink schedule of the macro terminal.

Although not illustrated in FIG. 10, information associated with the uplink silence resource and/or the downlink silence resource may be shared between the macro base station and the small base station. Sharing of information between the macro base station and the small base station may be performed through triggering, indicating, requesting, granting, signaling, exchanging, and the like.

The embodiment of FIG. 10 may include a configuration procedure of the small base station and a detection of the victim terminal. The configuration procedure of the small base station will be further described with reference to FIG. 11. Through the configuration procedure of the small base station, the small base station may further easily identify a desired signal that may be transmitted from a small cell terminal to the small base station, and an undesired interference signal that may be transmitted from the macro terminal to the small base station. Accordingly, a measurement used in the interference coordination may be more accurately performed.

In one example embodiment, there may be two schemes used to recognize, by the small base station, the victim terminal. First, the small base station or the macro base station may recognize the victim terminal based on a report of the macro terminal. Second, the small base station may recognize the victim terminal by detecting an uplink transmission of the victim terminal. The macro terminal positioned in a vicinity of the small base station may transmit data and/or control information using an uplink. The small base station may detect the uplink transmission of the macro terminal and perform the interference coordination by controlling a downlink power. In a case in which the victim terminal is detected using an uplink reference signal, the uplink reference signal may have a characteristic format distinguishable from data or noise, or may include marking distinguishable from data or noise.

FIG. 11 illustrates examples of operation 1010 illustrated in FIG. 10.

Referring to FIG. 11, information associated with the uplink signal of the macro terminal may be obtained using one or more of the following four schemes. Information associated with an uplink silence resource and/or a downlink silence resource may also be obtained using the following four schemes. Also, it is understood that the four information acquisition schemes described in the discussion of FIG. 11 are merely examples, and other methods and/or processes of obtaining such information may be used along with, or instead of, these examples. Although not illustrated in FIG. 11, a small base station may request that a macro base station share such information. In these four example schemes, information associated with the uplink signal of the macro terminal may be:

a) obtained via a home gateway using a wireline backhaul;
b) relayed from the macro terminal;
c) relayed from a small cell terminal served by the small base station; and/or
d) directly received from the macro base station over the air connection.

In FIG. 11, operations 1111 and 1113 indicate a signal flow in which information may be shared via the home gateway. The wireline backhaul may be, for example, an S1 interface or an X2 interface.

Operations 1121 and 1123 indicate a signal flow in which information may be shared by relaying of the macro terminal. For example, in operation 1121, the macro base station may transmit, to the macro terminal, information associated with the uplink signal of the macro terminal. In operation 1123, the macro terminal may relay, to the small base station, information associated with the uplink signal of the macro terminal.

Operations 1131 and 1133 indicate a signal flow in which information may be shared by relaying of the small cell terminal. For example, in operation 1131, the macro base station may transmit, to the small cell terminal, information associated with the uplink signal of the macro terminal. In operation 1133, the small cell terminal may relay, to the small base station, information associated with the uplink signal of the macro terminal.

Operation 1141 indicates a signal flow in which information may be directly transmitted from the macro base station to the small base station.

Operation 1151 indicates a signal flow in which the macro terminal may transmit an uplink signal to the macro base station. Operation 1153 indicates a signal flow where the macro terminal transmits the uplink signal to the small base station. The small base station may recognize the victim terminal by detecting the uplink signal of the macro terminal.

Figure 12:
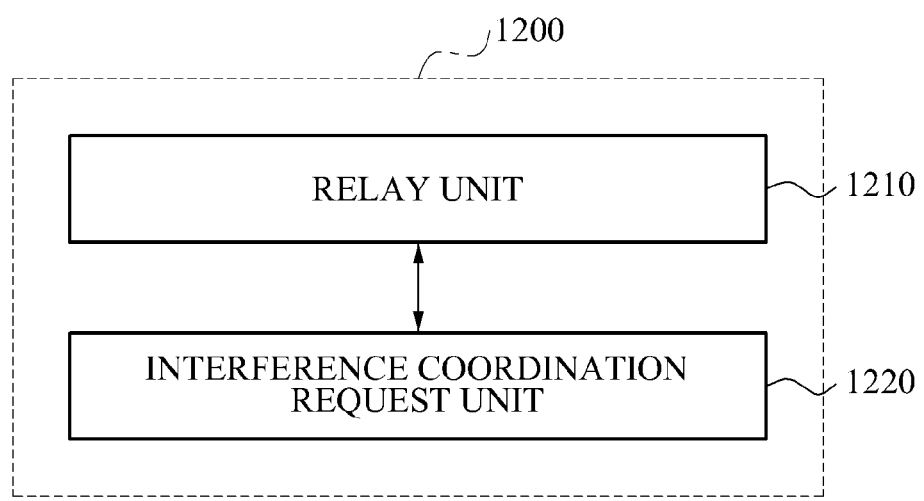
FIG. 12 is a block diagram illustrating an example of a user terminal.

FIG. 12 illustrates an example of a user terminal 1200.

Referring to FIG. 12, the user terminal 1200 may include a relay unit 1210 and an interference coordination request unit 1220. The user terminal 1200 may be a macro terminal served by a macro base station, a small cell terminal served by a small base station, or the like.

The relay unit 1210 may relay, to the small base station, information associated with an uplink signal of the macro terminal that is received from the macro base station. The small base station may also transmit information to the macro base station. When information is transmitted from the small base station to the macro base station, the relay unit 1210 may relay, to the macro base station, information received from the small base station. A variety of information may be shared between the macro base station and the small base station according to operation of the relay unit 1210. For example, the relay unit 1210 may perform operation 1123 or 1133 of FIG. 11.

The interference coordination request unit 1220 may transmit a message associated with an interference coordination to the small base station or the macro base station, depending on whether an interference signal is received from the small base station. In a case in which the interference signal is received by the small base station, the message associated with the interference coordination may include information requesting a power control of the small base station.

When the user terminal 1200 operates as the macro terminal, a downlink of the user terminal 1200 may be protected by a downlink silence resource allocated to the small base station.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of various example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of detecting a macro terminal and performing an interference coordination at a small base station, the method comprising:
    determining whether the macro terminal, which transmits a signal to a macro base station, exists within a cell coverage of the small base station, based on an uplink silence resource of the small base station that corresponds to an uplink resource of the macro terminal; and
    adjusting the cell coverage of the small base station according to whether the macro terminal exists within the cell coverage of the small base station, based on a downlink silence resource of the small base station that corresponds to a downlink resource of the macro terminal.

2. The method of claim 1, further comprising:
    sensing the signal transmitted from the macro terminal to the macro base station,
    wherein the determining a comprises determining whether the macro terminal exists within the cell coverage of the small base station, based on the sensed signal.

3. The method of claim 1, further comprising:
    allocating the uplink silence resource of the small base station to correspond to the uplink resource of the macro terminal,
    wherein the determining comprises determining whether the macro terminal exists within the cell coverage of the small base station, using the allocated uplink silence resource of the small base station.

4. The method of claim 1, wherein:
    the uplink silence resource of the small base station is applied alike to at least one neighboring small base station of the small base station; and
    each of the at least one neighboring small base station determines whether the macro terminal exists within a cell coverage of a corresponding neighboring small base station, based on the uplink silence resource of the at least one neighboring small base station.

5. The method of claim 1, wherein the determining comprises:
    performing an energy detection according to an energy detection scheme; and
    determining whether the macro terminal exists within the cell coverage of the small base station, based on the energy detection;
    performing channel sensing based on a correlation between multi-path channels in response to the macro terminal existing within the cell coverage of the small base station; and
    verifying whether the macro terminal exists within the cell coverage of the small base station, based on the channel sensing.

6. The method of claim 5, wherein the performing of the channel sensing comprises:
    estimating channel information based on a signal correlation of a received signal received from the macro terminal;
    calculating a comparison value based on the received signal and the estimated channel information; and
    comparing the comparison value with a threshold.

7. The method of claim 1, further comprising:
    reporting, to the macro base station, regarding whether the macro terminal exists within the cell coverage of the small base station,
    wherein the adjusting comprises adjusting a transmit power of the small base station.

8. The method of claim 1, wherein the adjusting comprises:
    expanding the cell coverage of the small base station in response to the macro terminal existing outside the cell coverage of the small base station.

9. A method of detecting a macro terminal and performing an interference coordination at a small base station, the method comprising:
    determining whether the macro terminal, which transmits a signal to a macro base station, exists within a cell coverage of the small base station according to an energy detection scheme, based on an uplink silence resource of the small base station that corresponds to an uplink resource of the macro terminal;
    estimating channel information based on a signal correlation of a received signal received from the macro terminal;
    calculating a comparison value based on the received signal and the estimated channel information;
    comparing the comparison value with a threshold;
    verifying whether the macro terminal exists within the cell coverage of the small base station, based on the comparison; and
    adjusting the cell coverage of the small base station according to whether the macro terminal exists within the cell coverage of the small base station, based on a downlink silence resource of the small base station that corresponds to a downlink resource of the macro terminal.

10. The method of claim 9, wherein the calculating comprises:
    calculating the comparison value further based on a Hermitian operation of the received signal.

11. A communication apparatus configured to detect a macro terminal and perform an interference coordination, comprising:
    a spectrum sensing unit configured to determine whether the macro terminal, which transmits a signal to a macro base station, exists within a cell coverage of a small base station, based on an uplink silence resource of the small base station that corresponds to an uplink resource of the macro terminal; and
    a cell coverage adjustment unit configured to adjust the cell coverage of the small base station according to whether the macro terminal exists within the cell coverage of the small base station, based on a downlink silence resource of the small base station that corresponds to a downlink resource of the macro terminal.

12. The communication apparatus of claim 11, wherein the spectrum sensing unit is further configured to:
    sense the signal transmitted from the macro terminal to the macro base station; and
    determine whether the macro terminal exists within the cell coverage of the small base station, based on the sensed signal.

13. The communication apparatus of claim 11, further comprising:
    a controller configured to allocate the uplink silence resource of the small base station to correspond to the uplink resource of the macro terminal, wherein the spectrum sensing unit is further configured to determine whether the macro terminal exists within the cell coverage of the small base station, using the allocated uplink silence resource of the small base station.

14. The communication apparatus of claim 11, wherein:

the uplink silence resource of the small base station is applied alike to at least one neighboring small base station of the small base station; and each of the at least one neighboring small base station determines whether the macro terminal exists within a cell coverage of a corresponding neighboring small base station, based on the uplink silence resource of the at least one neighboring small base station.

15. The communication apparatus of claim 11, wherein the spectrum sensing unit comprises:

a first detector configured to determine whether the macro terminal exists within the cell coverage of the small base station, according to an energy detection scheme; and a second detector configured to perform channel sensing based on a correlation between multi-path channels in response to the macro terminal existing within the cell coverage of the small base station, and verify whether the macro terminal exists within the cell coverage of the small base station, based on the channel sensing.

16. The communication apparatus of claim 15, wherein the second detector comprises:

a channel information estimator configured to estimate channel information based on a signal correlation of a received signal received from the macro terminal;

a comparison value calculator configured to calculate a comparison value based on the received signal and the estimated channel information; and a comparator configured to compare the comparison value with a threshold.

17. A method of detecting a macro terminal and performing an interference coordination at a small base station, the method comprising:

obtaining, from a macro base station, information of an uplink signal of the macro terminal, the uplink signal being transmitted from the macro terminal to the macro base station;

determining whether the macro terminal exists within a cell coverage of the small base station, based on an uplink silence resource of the small base station that corresponds to the uplink signal of the macro terminal; and performing a power control of the interference coordination according to whether the macro terminal exists within the cell coverage of the small base station, based on a downlink silence resource of the small base station that corresponds to a downlink resource of the macro terminal.

18. The method of claim 17, wherein the information of the uplink signal of the macro terminal is obtained via a home gateway using a wireline backhaul, or relayed from the macro terminal, or relayed from a small cell terminal served by the small base station, or directly received from the macro base station over an air connection, or any combination thereof.

19. The method of claim 17, wherein:

the uplink silence resource of the small base station, and the information of the uplink signal of the macro terminal, are shared by at least one neighboring small base station of the small base station; and each of the at least one neighboring small base station determines whether the macro terminal exists within a cell coverage of a corresponding neighboring small base station, based on the uplink silence resource of the at least one neighboring small base station that corresponds to the uplink signal of the macro terminal.

20. The method of claim 17, wherein:

the downlink silence resource of the small base station is shared by at least one neighboring small base station of the small base station; and the power control comprises turning off a transmit power of the small base station.

21. The method of claim 17, further comprising:

transmitting, to the macro base station, information of an awareness of the macro terminal; and receiving, from the macro base station, a message corresponding to the information of the awareness of the macro terminal.

22. A user terminal used in a communication system configured to detect the user terminal and perform an interference coordination in a multi-cell environment, comprising:

a relay unit configured to relay, to a small base station, information of an uplink signal of the user terminal that is received from a macro base station, the uplink signal being transmitted from the user terminal to the macro base station; and an interference coordination request unit configured to transmit, to the small base station or the macro base station, a message associated with the interference coordination in response to an interference signal being received from the small base station, wherein the small base station determines whether the user terminal exists within a cell coverage of the small base station, based on an uplink silence resource of the small base station that corresponds to the uplink signal of the user terminal, and adjusts the cell coverage of the small base station according to whether the user terminal exists within the cell coverage of the small base station, based on a downlink silence resource of the small base station that corresponds to a downlink resource of the user terminal.

* * * * *